United States Patent [19]

Stone

[11] Patent Number: 5,894,973
[45] Date of Patent: Apr. 20, 1999

[54] AUTOMOBILE THEFT DETERRENT DEVICE HOLDER

[76] Inventor: Dwight E. Stone, 2849 N. Third, Fresno, Calif. 93703

[21] Appl. No.: 08/884,249

[22] Filed: Jun. 30, 1997

[51] Int. Cl.$^6$ .................................................. B60R 7/00
[52] U.S. Cl. ........................ 224/275; 224/543; 224/555; 224/558; 296/37.15; 296/37.16
[58] Field of Search ................................ 224/275, 913, 224/935, 543, 545, 555, 558, 194, 563, 667, 669; 296/37.15, 37.16

[56] References Cited

U.S. PATENT DOCUMENTS

| | | | |
|---|---|---|---|
| 2,853,219 | 9/1958 | Schwartz | 224/275 |
| 3,014,759 | 12/1961 | Bing | 224/563 |
| 3,295,887 | 1/1967 | Bacon | 224/275 |
| 3,632,029 | 1/1972 | Sonner | 224/275 |
| 3,986,649 | 10/1976 | Heimstra | 224/275 |

Primary Examiner—David J. Walczak
Assistant Examiner—Timothy L. Maust
Attorney, Agent, or Firm—Mark D. Miller

[57] ABSTRACT

A safe and secure storage location for automobile theft deterrent devices (such as the Club®) which is both easily accessible to the driver, yet secure and out of the way of passengers. An elongated closable pouch having one or more strong clamps attached in alignment along the length of the pouch. The pouch includes two elongated panels which are mirror-images of each other attached together along their perimeters, except at the top where a zipper or Velcro® is provided. The pouch is designed such that the clamp(s) may be attached to a side of the vertical portion of an automobile driver seat. The strong clamps hold the pouch containing the automobile theft deterrent device securely in place so that it is out of the way of passengers, and less likely to cause injury in the event of an accident. Optional extenders may be provided on the clamps to more firmly secure them to the seat.

2 Claims, 1 Drawing Sheet

AUTOMOBILE THEFT DETERRENT DEVICE HOLDER

BACKGROUND OF THE INVENTION

The present invention relates to automobile theft deterrent devices, and more particularly to a new and removably secure pouch for holding automobile theft deterrent devices in a vehicle when not in use.

Automobile theft is a serious crime which has proliferated to the point where it is committed somewhere in the United States more than twice a minute, every minute of every day. With the great expense an owner invests in an automobile, and the relative unavailability of peace officers or security personnel to monitor parked vehicles, numerous automobile theft deterrent devices (ATDD's) have come into existence in recent years. These range from electronic alarms and transmitters to vehicle disabling apparatus. One of the most popular ATDD's is known as "The Club®." This devices is an elongated heavy metal bar having a U-shaped bracket at one end, an adjustable clamp at the other end, and an elongated arm. The Club® is designed for attachment to the steering wheel of a parked vehicle. It is visible and cumbersome, difficult to remove, and while in place, prevents the vehicle from being steered through turns. As a result, it tends to deter potential thieves from even bothering with a vehicle so equipped.

The Club® and similar ATDD's are only useful if employed every time the vehicle is parked. Accordingly, it is desirable to keep such an ATDD near the driver's seat of the vehicle for easy access. It is common for such ATDD's to be kept lying loosely on the floor of the passenger side of the vehicle front seat, or lying loosely on the floor of the back seat in order to be readily accessible by the driver. However, such unrestricted storage can prove hazardous, as the heavy metal device can become a dangerous projectile potentially causing injury in the event of an automobile accident. It is also inconvenient to passengers who desire to place their feet or packages on the floor of the automobile where the device is kept.

SUMMARY OF THE INVENTION

The present invention provides a safe and secure storage location for ATDD's such as the Club® which is both easily accessible to the driver, yet secure and out of the way of passengers. The invention is an elongated closable pouch having one or more clamps attached in alignment along the length of the pouch. The pouch includes two elongated panels which are mirror-images of each other attached together along their perimeters, except at the top where a closure (such as a zipper or interengaging hook and loops (Velcro®)) is provided. The pouch is designed such that the clamp(s) may be attached to a side of the vertical portion of an automobile driver seat. It is preferable to attach the pouch to the side closest to the outside wall of the vehicle, in the vicinity of the shoulder belt buckle, when not in use. The closable opening at the top extends slightly down one side, and allows for easy access to the interior of the pouch. After opening (e.g. unzipping) the pouch, the ATDD may be placed therein, and the pouch reclosed. The strong clamps hold the pouch containing the ATDD securely in place so that it is out of the way of passengers, and less likely to cause injury in the event of an accident. Optional extenders may be provided on the clamps to more firmly secure them to the seat.

It is therefore a primary object of the present invention to provide an apparatus for securely holding a heavy, elongated automobile theft deterrent device so that it is out of the way of automobile passengers and less likely to cause injury in the event of an accident.

It is also an important object of the present invention to provide a convenient means for storage of heavy, elongated automobile theft deterrent devices that is close to the vehicle driver, yet not in the way of passengers or instruments in the vehicle.

It is another object of the present invention to provide a convenient means for storage of heavy, elongated automobile theft deterrent devices that may be easily accessed from the front or back seat of the vehicle.

Other objects of the invention will be apparent from the detailed descriptions and the claims herein.

DETAILED DESCRIPTION OF THE DRAWINGS

Figure 3:
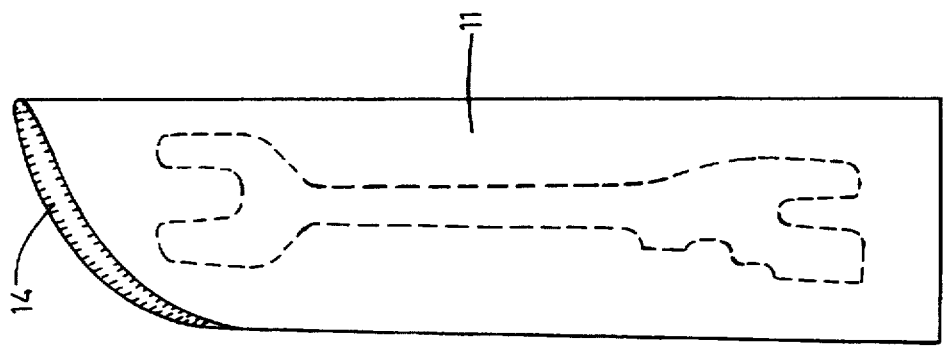
FIG. 3 is an opposite side view of the present invention in an open condition, the phantom lines are the ATDD.
Figure 2:
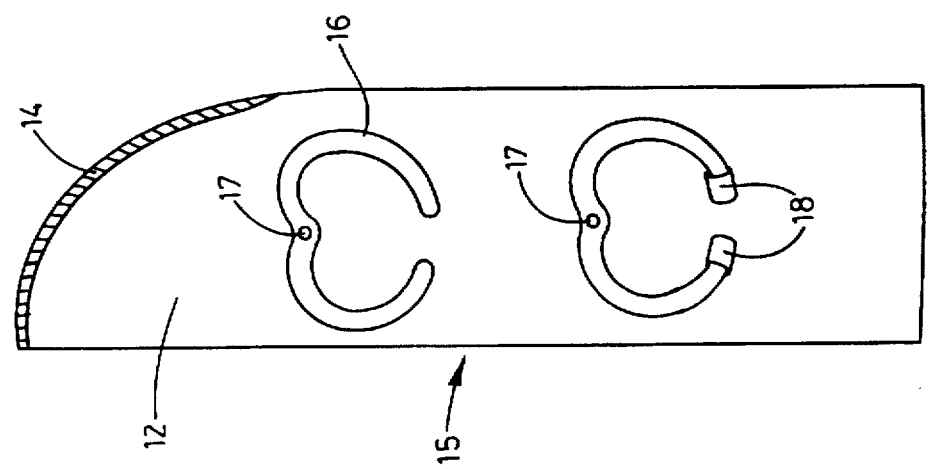
FIG. 2 is a side view of the present invention showing the zipper in the closed condition.
Figure 1:
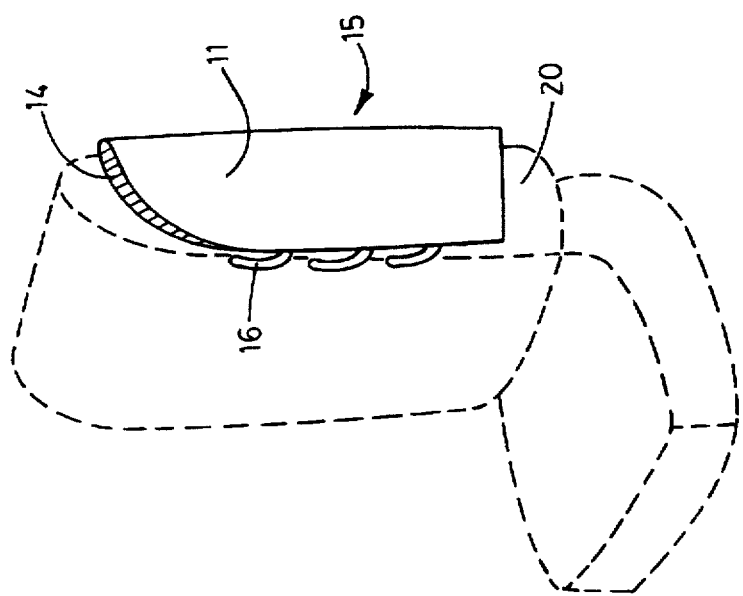
FIG. 1 is an environmental view of the pouch of the present invention. The driver's seat is shown in phantom lines.

Referring to the drawings wherein like reference characters designate like or corresponding parts throughout the several views, and referring particularly to FIGS. 1 and 2 it is seen that the invention includes a pair of fabric panels 11, 12 sewn or otherwise permanently attached together along their perimeters, except at the top, to form an elongated pouch, generally 15. A closure 14 (such as a zipper or Velcro®) is provided at the top of the pouch. At least one, but as many as four C-shaped clamps 16 are provided in vertical alignment along one panel, attached thereto using appropriate attachment means 17 (such as a rivet, stitching, or the like). The clamps 16 attach to the side of a vehicle driver seat 20. For small vehicle seats, optional extensions 18 may be provided which extend the arms of the clamps 16 for a better, more secure hold on the seat 20.

In use, the pouch is secured to the side of a vehicle seat using the clamp(s) provided. If the seat is tall, or the ATDD is long, multiple clamps should be provided on the pouch. If the seat is thin, extensions 18 should be used to assure a firm hold. The closure is opened, the ATDD is inserted, and the closure closed again. The ATDD remains available for immediate use, but is out of the way of the driver and passengers, and is less likely to become a heavy flying hazard in the event of an accident.

DESCRIPTION OF THE PREFERRED EMBODIMENTS

In the preferred embodiment, the fabric panels 11, 12 may be made of leather, vinyl or other durable material. The closure 14 may be a zipper, interengaging hooks and loops (Velcro®), snaps, buttons or other appropriate means. The C-shaped clamps 16 should be of strong yet slightly-flexible metal, or thick plastic, and should be wide enough to hold firmly to the side of a vehicle front seat. The attachment means 17 should be strong enough to hold the heavy metal of the ATDD, preferably rivets or the like. For small seats, optional extensions 18 should be made of metal or heavy plastic in order to extend the arms of the clamps for a better, more secure hold.

Longer versions of the pouch should use two, three or even four clamps 16 in order to securely hold the ATDD to the side of the vehicle seat.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

I claim:

1. A holder for an automobile theft deterrent device comprising a pair of elongated fabric panels joined along their perimeters leaving an opening at one end, a closure at the open end, and at least one clamp having a C shape provided in vertical alignment on one of said panels for attachment to the side of the vertical portion of a vehicle seat wherein a plurality of hollow tubular extension pieces are provided for attachment to the ends of said at least one C-shaped clamp.

2. A holder for an automobile theft deterrent device comprising a pair of fabric panels, each such panel including a flat bottom, two elongated parallel sides, and a rounded top, the bottoms and sides of said panels being attached to each other at the perimeter to form an elongated pouch with an open rounded top, a means for closing the top, and at least one C-shaped clamp is provided in vertical alignment on the outside surface of one of said panels for attachment to the side of the vertical portion of a vehicle seat wherein a plurality of hollow tubular extension pieces are provided for attachment to the ends of said at least one C-shaped clamp.

\* \* \* \* \*